United States Patent [19]

Crosser

[11] Patent Number: 4,779,419

[45] Date of Patent: Oct. 25, 1988

[54] ADJUSTABLE FLOW LIMITING PRESSURE COMPENSATED FLOW CONTROL

[75] Inventor: Jeffrey A. Crosser, Joliet, Ill.

[73] Assignee: Caterpillar Inc., Peoria, Ill.

[21] Appl. No.: 796,820

[22] Filed: Nov. 12, 1985

[51] Int. Cl.[4] .......... F15B 11/16; F15B 15/18; F16K 31/14

[52] U.S. Cl. .......... 60/452; 60/462; 91/446; 137/495

[58] Field of Search .......... 60/445, 450, 452, 459; 91/446, 448, 462, 528, 451, 452; 137/495, 503, 333; 251/325

[56] References Cited

U.S. PATENT DOCUMENTS

| | | | |
|---|---|---|---|
| 2,272,684 | 2/1942 | Vickers . | |
| 2,484,916 | 10/1949 | Tucker | 60/459 X |
| 3,115,891 | 12/1963 | Kimm | 137/503 X |
| 3,232,306 | 2/1966 | Miller et al. | 137/495 X |
| 3,532,104 | 10/1970 | Hoen | 137/503 X |
| 3,602,104 | 8/1971 | Strempel | 91/448 X |
| 3,707,988 | 1/1973 | Hodgson | 137/596.12 |
| 3,946,561 | 3/1976 | Riedhammer | 60/450 X |
| 3,978,666 | 9/1976 | Kelly et al. | 60/459 X |
| 4,020,867 | 5/1977 | Sumiyoshi | 91/446 X |
| 4,096,694 | 6/1978 | Habiger et al. | 60/459 |
| 4,193,263 | 3/1980 | Ille | 60/420 |
| 4,355,510 | 10/1982 | Ruseff | 60/452 |
| 4,515,181 | 5/1985 | Dezelan | 60/452 X |

FOREIGN PATENT DOCUMENTS

| | | | |
|---|---|---|---|
| 2423496 | 11/1975 | Fed. Rep. of Germany | 137/503 |
| 2268212 | 11/1975 | France . | |

OTHER PUBLICATIONS

Pippenger, J. J., et al., *Fluid Power Controls*, New York, N.Y.: McGraw-Hill Book Co., Inc., 5/1959, pp. 78-80.

Yeaple, F., *Fluid Power Design Handbook*, New York, N.Y.: Marcel Dekker, Inc., 5/1984, pp. 233-235.

*Primary Examiner*—Robert E. Garrett
*Assistant Examiner*—George Kapsalas
*Attorney, Agent, or Firm*—John W. Grant

[57] ABSTRACT

A pressure-compensated flow-control valve with an adjustable limiting device controls the maximum speed of a fluid motor and eliminates an additional valving element found in prior art device. The flow control valve includes a flow limiting throttle opening integral with the flow control spool. The spool can be selectively rotated to adjust the effective size of the throttle opening thereby limiting flow through the valve. The spool establishes a constant rate of flow determined by the throttle opening or a directional control valve. By incorporation of the flow limiting function within the flow control spool, the overall cost and complexity of the pressure compensated flow control valve is reduced.

7 Claims, 1 Drawing Sheet

ADJUSTABLE FLOW LIMITING PRESSURE COMPENSATED FLOW CONTROL

BACKGROUND OF THE INVENTION

1. Field of the Invention

This invention relates generally to a pressure compensated flow control valve and more particularly to a pressure compensated flow control valve which is selectively adjustable to limit the constant rate of flow to the fluid motor.

2. Description of the Prior Art

Many hydraulic systems have a pressure compensated flow control valve for maintaining a constant rate of fluid across a directional control valve regardless of the load on the motor. U.S. Pat. No. 4,193,263 dated Mar. 18, 1980 discloses a variation of the pressure compensated flow control valve in that it is independently variable to determine the constant flow rate when the directional control valve is at a wide open operating position. More specifically, that valve includes a separate rotatable throttle valve element downstream of the main flow control spool to alter the pressure drop across the flow control valve. One of the disadvantages of that arrangement is that the additional rotatable throttle valve element is separate from the flow control spool thereby increasing the complexity and cost of the valve mechanism. Moreover, the parts distribution system would necessarily have to maintain an inventory of both parts thereby further adding to the overall cost of the valve mechanism. Finally, the additional valve element creates an additional leakage path which can cause metering differences for the flow control spool due to changes in hydraulic oil temperature.

The present invention is directed to overcoming one or more of the problems as set forth above.

SUMMARY OF THE INVENTION

In one aspect of the present invention, a fluid system includes a fluid supply means, a fluid motor and a directional control valve movable between a neutral position and an operating position for controlling fluid flow from the fluid supply means to the fluid motor. A pressure compensated flow control valve has a valve spool responsive to load pressure at the fluid motor and is adapted to maintain a constant rate of fluid flow to said fluid motor when the directional control valve is in said operating position. The flow control valve spool has an adjustable flow limiting means integral therewith for selectively limiting the constant rate of fluid flow.

In another aspect of the present invention, a fluid control valve comprises a body having a bore and an inlet port, an outlet port and a signal port in communication with the bore. A flow control spool is slidably and rotatably disposed in the bore in the body and defines therewith a pressure chamber and a signal chamber with the signal chamber being in communication with the signal port. The spool has a passage in communication with the pressure chamber and is axially movable in the bore from a first position at which the passage is in unrestricted communication with the inlet port to an infinitely variable second position at which the passage is in restricted communication with the inlet port. A means is provided for biasing the spool toward the first position. An adjustable flow limiting means integral with the spool selectively varies communication between the pressure chamber and the outlet port independent of the axial position of the spool.

The disadvantage of utilizing a separate valve element to provide a flow limiting capability for a pressure compensated flow control valve is overcome by modifying the primary flow control spool so that the single flow control spool provides both functions, i.e. pressure compensated flow control and flow limiting. By providing both functions with a single valve element, both the complexity of the valve and the cost of manufacturing the valve is reduced.

DESCRIPTION OF THE PREFERRED EMBODIMENT

Figure 3:
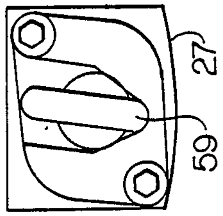
FIG. 3 is an end view as viewed generally along line III—III of FIG. 1.

Referring now to the drawing, a hydraulic fluid system 10 includes a fluid motor 11, a directional control valve 12, a pressure compensated flow control valve 13, and a fluid supply 14 which includes a pump 16 and a tank 17. The fluid motor 11 is illustrated as an extendable and retractable hydraulic cylinder but alternatively could be a rotary fluid motor. The directional control valve 12 has an inlet port 18, a load pressure signal port 19, a tank port 21 connected to the tank 17, and a pair of motor ports 22,23 connected to opposite ends of the fluid motor 11. A pair of infinitely variable metering orifices 24,26 are provided for selectively communicating the inlet port 18 with the motor ports 22,23 at operating positions of the directional control valve.

The pressure compensated fluid control valve 13 includes a multipiece body 27 and a single cylindrical flow control spool 28. The body 27 has a longitudinally extending bore 29 therein and an inlet port 31, an outlet port 32 and a signal port 33 in fluid communication with the bore 29. The inlet port 31 is in communication with the pump 16 through a supply conduit 34. The outlet port 32 is in communication with the inlet port 18 of the directional control valve 12 through a conduit 36. The signal port 33 is in communication with the load pressure signal port 19 of the directional control valve 12 through a signal line 37. The inlet port 31 includes an annular chamber 38 surrounding and intersecting the bore 29. The outlet port 32 includes an enlarged chamber 39 intersecting with and extending only partially around the bore 29.

The flow control spool 28 is slidably and rotatably disposed in the bore 29 of the body 27 and partially defines a pressure chamber 41 and a signal chamber 42 separated by a bulkhead portion 43 of the spool. The signal chamber 42 is in communication with the signal port 33. A plurality of radially extending passages 44 in the spool communicate with the pressure chamber 41 and, with the spool in the position shown in the drawings, with the annular chamber 38 of the inlet port 31. The passages are circumferentially and axially spaced and sized to provide a progressively decreasing flow path therethrough as the spool is moved to the right from the position shown in the drawing. A transverse slot 46 is formed in the spool at one end thereof.

The flow control spool 28 also includes an adjustable flow limiting means 47 integral therewith for selectively varying communication between the pressure chamber 41 and the outlet port 32 independent of the axial position of the spool. The adjustable flow limiting means includes an adjustable orifice means 48 for adjustably controlling communication between the pressure chamber 41 and the outlet port 32 and means 49 for selectively rotating the spool relative to the body and adjusting the size of the adjustable orifice means 48.

The adjustable orifice means 48 includes a throttle opening 51 in the spool 28 positionable for selectively variable communication with the outlet port 32. Counterclockwise rotation of the spool 28 as viewed in FIG. 2 causes the body 27 to progressively close the effective size of the throttle opening 51.

The body 27 includes a plug 52 extending into the bore at the end of the spool 28 having the slot 46 therein. The plug 52 has a stepped bore 53 therein with a portion thereof being threaded. A stem 54 of a rotatable actuator 56 is positioned in the stepped bore 53 and has a threaded portion 57 threadably extending through the threaded portion of the bore 53. The inner end of the actuator 56 has a tang 58 slidably extending into the slot 46 in the spool so that the spool can move axially relative to the actuator. A knob 59 is fixedly attached to the outer end of the stem 54. The actuator 56, the knob 59 and the slot 46 define the means 49 for selectively rotating the spool 28 relative to the body 27 and adjusting the effective size of the orifice means 48.

The spool 28 is resiliently biased to the position shown by a spring 62 positioned in the signal chamber 42.

In this embodiment the pump 16 is a variable displacement pump 16 having a compensator 63 connected to the signal conduit 37. However, alternatively, the pump 16 can be a fixed displacement pump with the system then including a pressure compensated bypass valve (not shown) connected to the supply conduit 34.

Industrial Applicability

The directional control valve 12 is movable between a neutral position as shown in the drawings and first and second operating positions for controlling fluid flow from the fluid supply 14 to the fluid motor 11. More specifically, at the neutral position, the inlet port 18 is isolated from both the motor ports 22,23 and the signal port 19 is in communication with the outlet port 21. Moving the valve 12 to the right to the first operating position interconnects the inlet port 18 with the motor port 22 through the metering orifice 24 and the motor port 23 with the outlet port 21. Conversely, moving the valve 12 leftwardly to the second operating position interconnects the inlet port 18 with the motor port 23 through the metering orifice 26 with the motor port 22 being connected to the outlet port 21.

Figure 1:
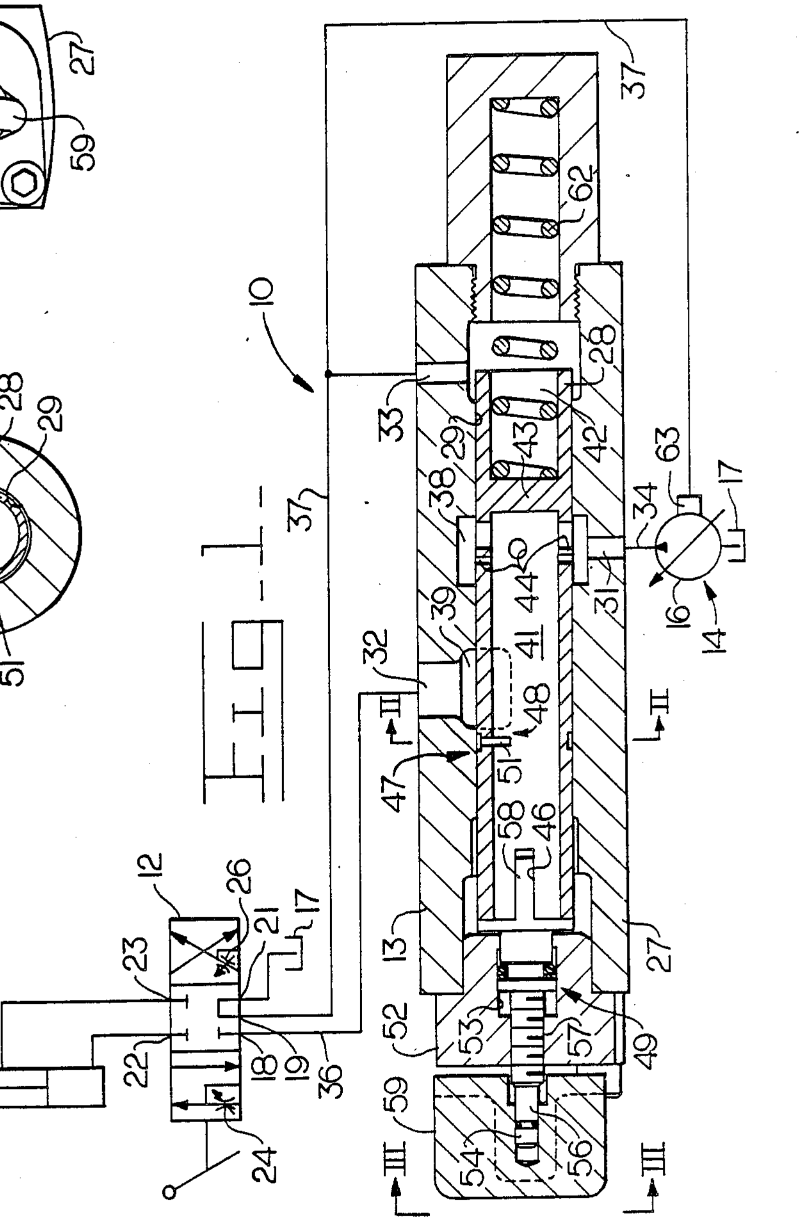
FIG. 1 is a schematic illustration of an embodiment of the present invention with portions thereof shown in cross section.

When there is no fluid pressure in the supply conduit 34 such as when the pump 16 is not being driven by its power source, the flow control spool 28 is moved to the axial position shown in FIG. 1 by the spring 62. At this position communication through the throttle opening 51 is blocked by the body 27 and the flow control spool 28 thus provides a load check function to prevent reverse flow of fluid from the directional control valve 12 to the pump 16.

Putting the pump 16 into operation with the flow control spool 28 in the position shown immediately establishes a fluid pressure in the pressure chamber 41 causing the flow control spool 28 to move to the right against the bias of the spring 62. The rightward movement establishes communication through the throttle opening 51 between the pressure chamber 41 and the outlet port 32. The rightward movement of the flow control spool 28 also results in the body 27 progressively closing off communication through the passages 44 between the inlet port 31 and the pressure chamber 41 and will continue until the spool reaches a position at which the fluid pressure in the pressure chamber 41 is equivalent to the biasing force of the spring 62. Generally, this pressure is about 345 kPa (50 psi). The compensator 63 on the pump 16 is generally set so that the pump displacement is adjusted to provide a fluid pressure in the supply line 34 of about 1,380 kPa (200 psi) greater than the pressure in the signal conduit 37 which under this condition is zero.

Figure 2:
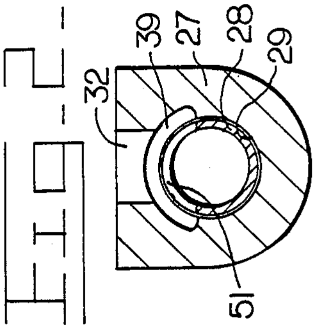
FIG. 2 is a sectional view taken generally along line II—II of FIG. 1 but with the spool moved rightwardly to another position.

Moving the directional control valve 12 rightwardly to the first operating position directs pressurized fluid to the fluid motor 11. The signal port 19 is connected to the motor port 22 downstream of the metering orifice 24 so that a signal equal to the load pressure in the fluid motor is transmitted through the signal line 37 to both the signal chamber 42 and the compensator 63. Assuming that the rotational position of the flow control spool 28 is as shown in FIG. 2 such that fluid flow through the throttle opening 51 is substantially unrestricted, the flow control spool 28 will move axially in the bore 29 to a position at which sufficient flow is directed to the directional control valve to maintain a pressure differenial of about 345 kPa between the inlet port 18 and the motor port 22. This pressure differential will be maintained regardless of the load on the fluid motor and will result in a constant rate of fluid flow to the fluid motor 11 commensurate with the degree of metering across the metering orifice 24. As long as fluid flow through the throttle opening 51 is unrestricted thereby, the constant rate of fluid flow will be determined by the operating position of the directional control valve.

If it is desired to limit the rate of fluid flow to the fluid motor 11 independent of the position of the directional control valve 12, the knob 59 is rotated counterclockwise as viewed in FIG. 3 to rotate the flow control spool 28 within the bore 29 to a position at which the body 27 reduces the effective size of the throttle opening 51. This in effect creates an orifice upstream of the metering orifice 24 and limits fluid flow to the directional control valve 12. Thus, if the directional control valve 12 is at its wide open operating position, the throttle opening 51 will be the limiting opening in the fluid flow path to the fluid motor 11. The fluid control spool 28 will move to an axial position to maintain about a 345 kPa pressure differential between the pressure chamber 41 and the outlet port 32. The constant flow rate to the fluid motor will thus be limited or controlled by the degree of opening of the throttle opening 51 to limit the operating speed of the fluid motor 11. Of course, the directional control valve 12 can still be manually manipulated to provide a fluid flow rate less than that established by the throttle opening 51 in the flow control spool 28.

It should be noted that when the directional control valve 12 is moved to an operational position the load pressure signal directed through signal conduit 37 to the compensator 63 causes the pump displacement to be increased so that the fluid flow rate in the supply conduit 34 is sufficient to maintain the fluid pressure therein at about 1,380 kPa greater than the load pressure signal.

It should also be noted that moving the directional control valve 12 leftwardly will establish similar operating characteristics as described above.

In view of the foregoing, it is readily apparent that the structure of the present invention provides an improved pressure compensated flow control valve having only a single flow control spool therein which provides both a flow control function for maintaining a constant rate of flow to a fluid motor and a flow limiting function for selectively limiting the constant rate of flow. The flow control spool is axially movable in the usual manner to provide the flow control function and is selectively rotatable for controlling a throttle opening to provide the flow limiting function. By providing both functions with a single element, the cost and complexity of the valve is reduced.

Other aspects, objects and advantages of this invention can be obtained from a study of the drawings, the disclosure and the appended claims.

I claim:

1. In a fluid system including a fluid supply, a fluid motor and a directional control valve movable between a neutral position and an operating position for controlling fluid flow from the fluid supply to the fluid motor, the improvement comprising a pressure compensated flow control valve having a flow control spool responsive to load pressure at the fluid motor and adapted to maintain a constant rate of fluid flow to the fluid motor when the directional control valve is in said operating position, said flow control spool having adjustable flow limiting means integral therewith for selectively limiting said constant rate of fluid flow, said adjustable flow limiting means includes an adjustable orifice means for adjustably limiting fluid flow to the directional control valve and means for selectively rotating the flow control spool and adjusting the size of the adjustable orifice means.

2. The fluid system of claim 1 wherein said pressure compensated flow control valve includes a body having a bore therein, and an outlet port intersecting with the bore and being connected to the directional control valve, said flow control spool being both slidably and rotatably positioned in the bore, said adjustable orifice means including a throttling opening in the flow control spool positionable for selective variable communication with the outlet port.

3. The fluid system of claim 2 wherein said rotating and adjusting means includes a slot in the flow control spool at one end thereof and a rotatable actuator extending into the bore and having a tang slidably extending into the slot so that the spool can move axially relative to the rotatable actuator.

4. A pressure compensated flow control valve comprising:

a body having a bore and an inlet port, an outlet port, and a signal port in communication with the bore;

a flow control spool slidably and rotatably disposed in the bore in the body and defining therewith a pressure chamber and a signal chamber with said signal chamber being in communication with the signal port, said flow control spool having a passage in communication with the pressure chamber and being axially movable in the bore from a first position at which the passage is in unrestricted communication with the inlet port to an infinitely variable second position at which the passage is in restricted communication with the inlet port;

a spring biasing the flow control spool toward the first position; and adjustable flow limiting means integral with the flow control spool for selectively varying communication between the pressure chamber and the outlet port independent of the axial position of the flow control spool.

5. The control valve of claim 4 wherein said adjustable flow limiting means includes an adjustable orifice means for adjustably limiting communication between the pressure chamber and the outlet port and means for selectively rotating the flow control spool and adjusting the size of the adjustable orifice means.

6. The control valve of claim 5 wherein said adjustable orifice means includes a throttle opening in the flow control spool positionable for selective variable communication with the outlet port.

7. The control valve of claim 6 wherein said adjusting and rotating means includes a slot in the flow control spool at one end thereof and a rotatable actuator extending into the bore and having a tang slidably extending into the slot.

* * * * *